JOHN T. BUTLER.

Improvement in Bale Ties.

No. 122,563.  Patented Jan. 9, 1872.

WITNESSES.  INVENTOR.

UNITED STATES PATENT OFFICE.

JOHN T. BUTLER, OF NEW ORLEANS, LOUISIANA.

IMPROVEMENT IN BALE-TIES.

Specification forming part of Letters Patent No. 122,563, dated January 9, 1872.

Be it known that I, JOHN T. BUTLER, of the city of New Orleans and State of Louisiana, have invented a certain new and useful Improvement in Bale-Ties; and I do hereby declare the following to be a full, clear, and exact description of the same, reference being had to the annexed drawing making a part of this specification, in which—

Figure 1:
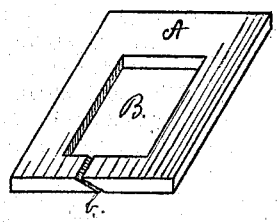
Figure 2:
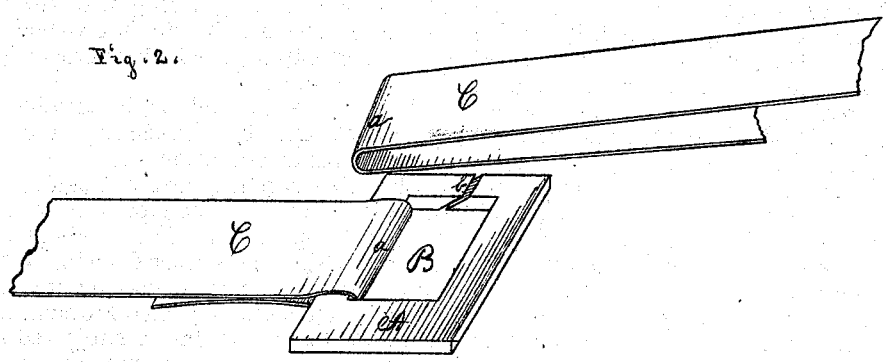

Figure 1 is a perspective view of my improved buckle or tie without the bale-bands attached thereto, while Fig. 2 is a perspective view of the buckle with one end of the bale-band inserted in the opening therein, and with the opposite end of the said bale-band free from the buckle, but ready to be inserted within the said opening of the said buckle.

My improvement involves a bale-tie, A, which shall be constructed in as simple and economical a manner as possible, which shall possess all the strength that is requisite to sustain the utmost tension or strain to which it may be subjected on a bale of cotton when compressed to the utmost extent, and at the same time be provided with an opening, B, of sufficient capacity to admit the ends of a band and to allow them to be bent therein into hook form, as shown on the drawing, at $a$, of Fig. 2, and when so bent to have a reasonable space besides between the said ends for their free play or movement when the bale of cotton upon which they may be placed may be subjected to rough handling, a contingency, as experience has demonstrated, against which it is highly necessary to make ample provision. My invention furthermore involves a narrow lateral diagonal cleft, $b$, communicating with the aforesaid interior opening B, of sufficient width only to admit the band edgewise, either before or after it has been bent or folded into hook form, or to receive them otherwise, as convenience may require, to the end of securing the taking up of all the slack of each of the bands on a bale of cotton, while the same may be subjected to pressure, and, as a resulting consequence, secure uniformity of length as to all of the bands, and thereby give to the bale symmetrical proportions and regularity of form after it is taken from the compressing-machine.

My buckle-tie fulfills all the above conditions, and accomplishes the result sought to be attained by it in a simple, economical, and effectual manner, as I have thoroughly demonstrated by repeated experiments.

My device is like many buckles of this class, and like my buckle patented in the United States November 15, 1859, of regular rectangular form, of uniform thickness, and plain smooth surfaces, and similar to them also as to its exterior outline, but it differs from any other hitherto devised in the peculiar manner of cutting the lateral cleft $b$ diagonally through the sides of the buckle—or, in other words, at any angle with the plane of its surfaces—whereby an almost unbroken interior opening is secured from which it is utterly impossible for the bands to slip out, no matter how roughly the bale may be handled in transportation and shipment.

In respect to the lateral cleft $b$, as will be readily perceived by comparison, consists the novelty and distinguishing feature of my invention, especially as an improvement upon my former patent, to which reference has hereinbefore been made.

The buckle is struck off in suitable lengths from plate-iron by a machine, which, at one and the same operation that it cuts off the buckle also cuts the interior opening that receives the bands. The lateral cleft is cut by a separate operation. The bands above mentioned are shown upon the drawing by C. The solid portions of my buckles are of sufficient width and thickness of metal to sustain all the strain to which it might be subjected in practice under any and all circumstances of handling of bales of cotton or any other materials for which the buckles might be used.

Having described my improvements, what I desire to secure by Letters Patent is the following:

Claim.

The buckle or tie A, having an inclined slit, $b$, cut at an angle with the plane of the buckle, substantially as described and shown, and for the purpose set forth.

JOHN T. BUTLER.

Witnesses:
H. N. JENKINS,
L. J. OLMSTEAD. (7)